United States Patent [19]

Untz

[11] 4,417,645
[45] Nov. 29, 1983

[54] PORTA CLIMB CLIMBING TREE STAND

[76] Inventor: Reese E. Untz, Rte. 7, Box 665J, Charlotte, N.C. 28213

[21] Appl. No.: 255,829

[22] Filed: Apr. 20, 1981

[51] Int. Cl.³ .................. A45F 3/26; A47C 9/10; A01M 31/02
[52] U.S. Cl. .................. 182/135; 182/187; 108/152
[58] Field of Search .............. 182/187, 188, 134, 135; 108/152

[56] References Cited

U.S. PATENT DOCUMENTS

| 3,955,645 | 5/1976 | Dye | 182/135 |
|---|---|---|---|
| 3,960,240 | 6/1976 | Cotton | 182/187 |
| 4,230,203 | 10/1980 | Sweat | 182/134 |
| 4,316,526 | 2/1982 | Amacker | 182/187 |
| 4,321,983 | 3/1982 | Nelson | 182/188 |
| 4,331,216 | 5/1982 | Amacker | 182/187 |

OTHER PUBLICATIONS

"The Rifleman", Outdoor Life Magazine.

Primary Examiner—Reinaldo P. Machado
Attorney, Agent, or Firm—Richards, Shefte & Pinckney

[57] ABSTRACT

A portable tree climbing device for use by a hunter or observer waiting on game and using as the case may be, a bow and arrow, gun or camera. It comprises two assemblies, a main body supporting member and a foot supporting assembly, each assembly having a two piece steel tubular frame with respective telescoping arms that cooperatively encircle the tree or pole. Each piece of each assembly is particularly constructed of unitary lengths of steel tubing with a minimum of welds for maximized strength. The arms of each assembly have predrilled holes for selective alignment to adjust their effective length for different diameter trees or poles. The body supporting assembly includes a seat and a back rest and the foot supporting assembly has a wire mesh platform. The respective frames of the two assemblies are comparably constructed to fit together nestingly for storage and transport thereof.

9 Claims, 6 Drawing Figures

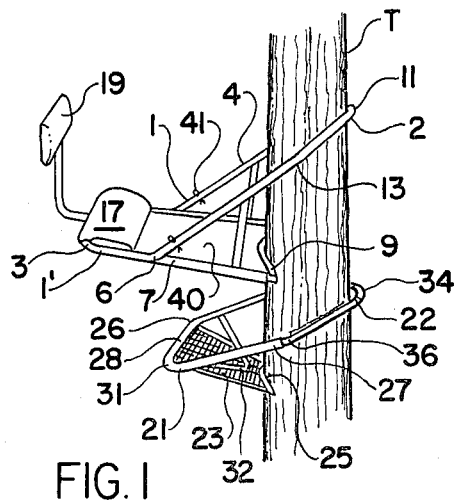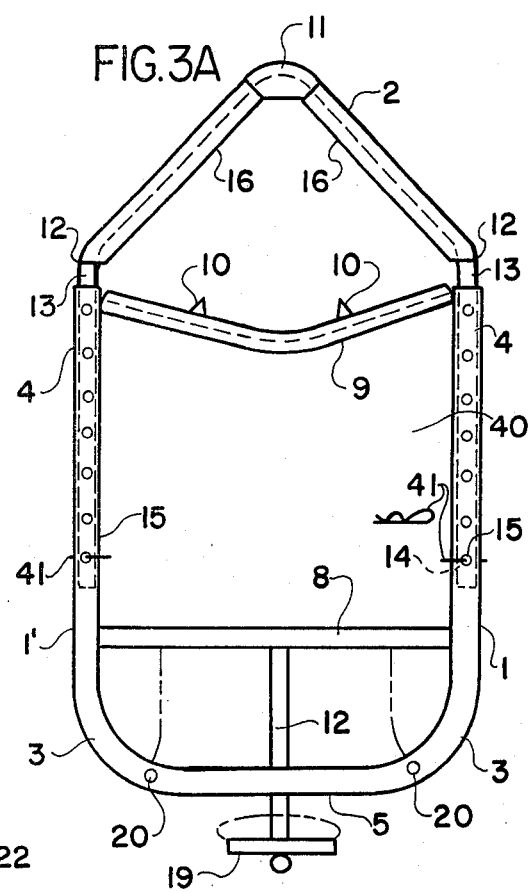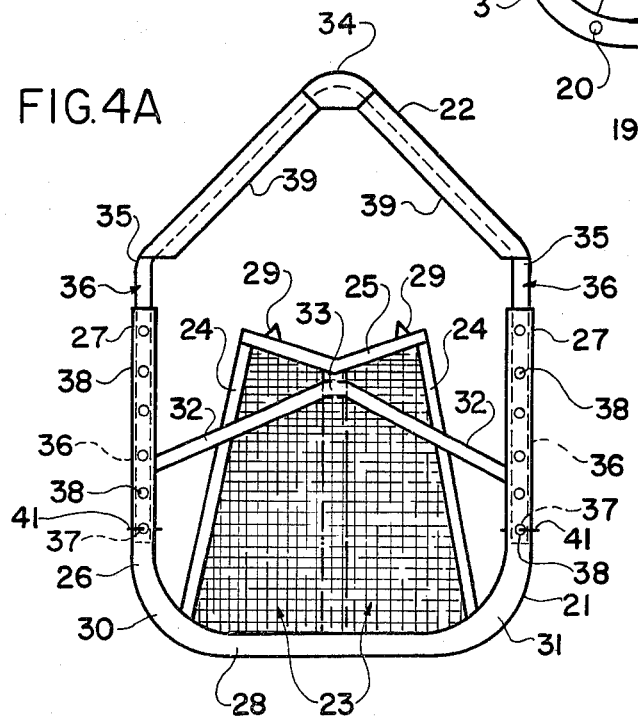

PORTA CLIMB CLIMBING TREE STAND

SUMMARY OF THE INVENTION

This invention relates to a new and improved portable tree climbing device for hunters or observers of wildlife. The device has two support assemblies, one providing a seat for supporting a user's main body and the other providing a platform for supporting the user's feet. Each assembly has a two piece frame, the pieces having telescoping arms for encircling the tree for supporting the assembly thereon and the telescoping arms are held together by steel hitch pins.

This invention employs leverage forces in its operation and is operated by selectively shifting the user's body weight from one assembly to the other such that a leverage force is created on the assembly supporting the user's weight to engage the assembly securely with the tree while no significant force is applied to the other assembly permitting it to be slidably moved along the tree. Thus, the user is enabled to climb up and down a tree trunk without limb obstruction with little effort by alternately standing on the foot assembly thereby applying leverage to it to engage it with the tree and raising or lowering the seat assembly along the tree trunk as desired, and then sitting on the seat assembly thereby applying leverage to it to engage it with the tree and raising or lowering the foot assembly with his feet under the seat assembly by either drawing his legs up under the seat assembly or extending his legs downwardly from the seat assembly, as desired. The user repeats the process until the desired height is reached or until he has lowered himself to the ground.

The object of the invention is to provide a constructionally improved compact tree climbing device by providing frames for each assembly using unitary-lengths of steel tubing braced for maximized strength to support 300 pounds or more safely. Two sizes of tubing are used for frame arms so they telescope into each other for compactness. A padded back and padded seat insure a fine degree of comfort.

The two support assemblies are compatibly constructed to be nestingly fitted together when not in use for compact storage and transport thereof.

Tree engaging blades and teeth are provided on both of the seat and foot assemblies which penetrate the bark of the tree sufficiently to hold the stand securely but do not harm the tree to the point of damage.

Both assemblies use steel tubing and 14 gauge metal for the blades and all materials are welded so no bolts are used to secure members together.

Steel hitch pins secure the telescoping arms which add strength and ease of installing, adjusting and removing the device from a tree.

In addition to all the above, the device provides an open area of the seat assembly for the legs to extend therethrough to the foot piece and offers the user the ability to stand on the foot piece and turn around facing the other direction still secure in the fact the seat assembly will stay where it is secured forming a safety belt arrangement to keep the user from falling forward or sideways.

BRIEF DESCRIPTION OF THE DRAWINGS

FIG. 1 is a perspective view of the tree climbing device of the present invention installed on a tree ready for use;

FIG. 3A is a side elevational view of the seat assembly of the device of FIG. 1

FIG. 4A is a side elevational view of the foot assembly of the device of FIG. 1

DESCRIPTION OF PREFERRED EMBODIMENT

Figure 3B:
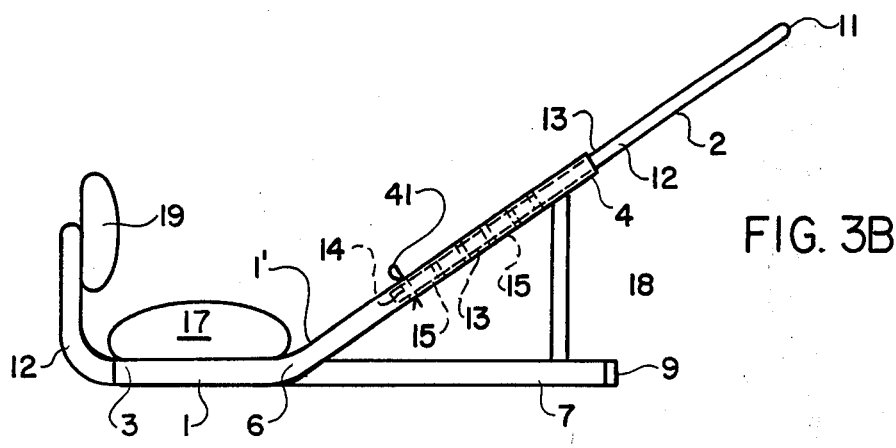
FIG. 3B is a top plan view thereof.

Referring now to the drawings, the main body supporting assembly, referred to generally speaking as the seat assembly, is shown in FIGS. 3A and 3B. The body supporting assembly includes a seat frame member 1 and a seat bracing frame member 2. The seat frame member 1 is formed of round metal tubing and includes a main frame element 1' formed of one unitary length of tubing bent 90° at locations 3 into a U-shape having arms 4 and a connecting portion 5 with each of the arms 4 being further bent at an approximately 30° upward incline at locations 6 spaced forwardly from the connecting portion 5. A brace 7 is welded to each arm 4 at its bend location 6 to extend forwardly therefrom and the opposite ends of a cross brace 8 are welded to the arms 4 at their bend locations 6 to extend therebetween. A tree-engaging blade 9 is welded at its ends to the forward ends of the braces 7 to extend therebetween. Relatively small teeth 10 are welded to the blade 9 to extend forwardly therefrom and are just large enough to go into the bark of a tree. A support brace 18 is welded between each arm 4 and each brace 7. A padded seat 17 is affixed to the connecting portion 5 and the cross brace 8 by two sheet metal screws 20. Tubing 12 is welded to the connecting portion 5 and to the cross brace 8 and is bent 90° upwardly and has a padded back rest 19 bolted thereto. Alternatively, a short piece of tubing may be welded to the connecting portion 5 and to the cross brace 8 and a smaller diameter telescoping back rest piece provided to form a removable seat back. An open area 40 is left between the side arms 4 and side braces 7, the seat 17 and the blade 9 through which open area the user's legs may extend.

The seat bracing frame member 2 is formed of a unitary length of round metal tubing of smaller diameter than that used for seat frame member 1, the tubing being bent approximately 90° at a central location 11 and approximately 45° at each of two locations 12 spaced from the location 11 on opposite sides thereof to provide a somewhat U-shape having arms 13. Each of the arms 13 has a tree engaging blade 16 welded thereto between the bend 11 and each bend 12. The arms 13 of the seat bracing frame member 2 are telescopically insertable into the arms 4 of the seat frame member 1. Each of the arms 13 has a hole 14 therethrough at its end and each of the arms 4 have a number of holes 15 therethrough spaced along their length. The holes 14 and 15 are brought into selective alignment by telescopic sliding movement of the arms 13,4 for adjusting them relative to each other and hitch pins 41 are provided to be inserted through aligned holes to hold the arms 13,4 in place.

The body supporting assembly is placed on a tree or pole T by positioning the seat frame member 1 on one side of the tree T with its arms 4 extending alongside the tree and positioning the bracing frame member 2 on the other side with its arms 13 extending alongside the tree into telescoping engagement with the arms 4. By leverage, the blades 9 and 16 engage the tree on the opposite sides thereof when weight is placed on the seat frame member 1 to securely hold the body supporting assembly on the tree. The body supporting assembly may be disengaged from the tree by upward tilting of the seat frame member to disengage the blades 9 and 16 from the tree and permitting the body supporting assembly to be slidably moved upwardly and downwardly along the tree. Importantly, the main frame element 1' of the seat frame member 1 and the seat bracing frame member 2, being each formed of unitary lengths of metal tubing, provide complete encircling of the tree with no welds or other points of increased susceptibility to stress and, in use, increased stress is created substantially only at the hitch pins 41. Further, the weld locations between the main frame element 1' and the braces 7 and the braces 18 are stressed in use only in a compressive fashion which is less likely to cause failure of the welds. In this manner, the strength of the seat frame assembly is substantially maximized and is considerably less subject to failure than conventional devices.

Figure 4B:
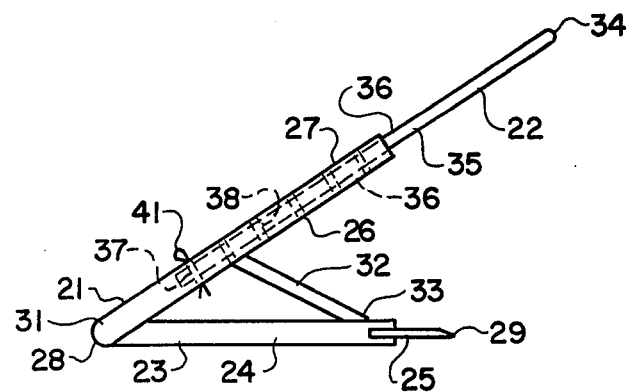
FIG. 4B is a top plan view thereof.

To foot supporting assembly is shown in FIGS. 4A and 4B and includes a foot platform frame member 21 and a foot bracing frame member 22. The foot platform frame member 21 has a platform element 23 which is a piece of perforated sheet metal having metal sides 24 welded about its side edges and having a tree engaging blade 25 with teeth 29 welded to its forward side edge. A main foot frame member 26 is formed of a unitary length of round metal tubing bent 90° at locations 30,31 into a U-shape having arms 27 and a connecting portion 28 and is welded along its connecting portion 28 to the rearward side edge of the platform element 23 to extend at an upward incline therefrom approximately the same as the upward incline of arms 4 of seat frame member 1. A brace 32 bent 90° at its middle point 33 is welded at its point 33 to a central location on the platform 23 and at its ends to the arms 27. The brace 32 thus permits the user's feet to be placed beneath the brace 32 to be supported on the platform 23.

The foot bracing frame member 22 is formed of a unitary length of round metal tubing of a smaller diameter than the tubing of the main foot frame member 26, bent 90° at its middle location 34 and 45° at the two locations 35 to be the same as the seat bracing frame member 2. Each of the arms 36 has a tree engaging blade 39 welded thereto between the bend 34 and the bends 35. The arms 36 of the foot bracing frame member 22 are telescopical in the arms 27 of the main foot frame member 26. The arms 36 have holes 37 at their ends and the arms 27 have a number of holes 38 spaced along their length for selective alignment with the holes 37 in telescopic engagement of the arms 27,36 to adjust them relative to each other and hitch pins 41 are provided to be inserted through aligned holes to hold the arms 27,36 in place.

The foot supporting assembly is placed on a tree T in the same manner as the body supporting assembly by positioning of the foot platform member 21 and the bracing frame member 22 on opposite sides of the tree and telescopically assembling them and the foot supporting assembly is similarly engagable with the tree by leverage pressure and disengagable for sliding movement by tilting of the foot platform member upwardly. The user's feet are used to lift against the brace 32 to effect tilting of the foot platform member 21. As with the seat frame assembly, the main foot frame member 26 and the foot bracing frame member 22, being unitary lengths of metal tubing, have no points of increased susceptibility to stress. In use, increased stress is placed substantially only on the hitch pins 41. Further, the weld location between the main foot frame member 26 and the platform element 23 and the brace 32 are stressed only compressively. Thus, the foot frame assembly is similarly uniquely of maximized strength.

In use, as seen in FIG. 1, the foot supporting assembly is placed on the tree T below the body supporting assembly. The user sits on the seat 17 with his or her legs through the opening 40 and the user places his or her feet on the platform element 23 beneath the brace 32. When sitting on the seat 17, the body supporting assembly is held in engagement against the tree T by leverage pressure by the user's body weight and the user's feet can manipulate the foot supporting assembly to tilt it upwardly and, as desired, slide it upwardly or downwardly along the tree. When standing on the platform element 23, the foot supporting assembly is held in place against the tree T by leverage pressure and the user may tilt the body supporting assembly upwardly and, as desired slide it upwardly or downwardly along the tree. By alternating these actions, the user can climb upwardly or downwardly along a tree trunk.

Figure 2:
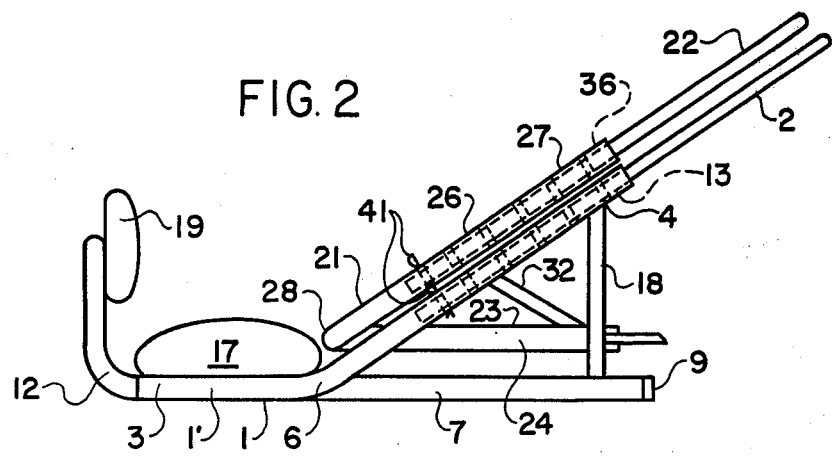
FIG. 2 is a side elevational view of the seat and foot assemblies of the device of FIG. 1 nested together for easy carrying over the shoulder and storage.

As best seen in FIG. 2, when not in use, the foot supporting assembly fits neatly on the body supporting assembly in a nesting fashion for storage and easy transportation in and out of the woods. The angle of upward incline of the arms 4 of the seat frame member 1 and of the arms 27 of the foot platform member 21 are the same and the platform element 23 is smaller dimensionally than the space between the sides of the seat frame member so that the platform element will extend downwardly through such space forwardly of the seat 17, and overlying the blade 25, and the arms 27 and the bracing frame member 22 sit on top of the arms 4 and bracing frame member 2.

The foregoing is considered as illustrative only of the principle of the invention. Further, since numerous modifications and changes will readily occur to those skilled in the art, it is not desired to limit the invention to the exact construction and operation shown as described, and accordingly all suitable modifications and equivalents may be resorted to, falling within the scope of the invention as claimed.

I claim:

1. An apparatus for climbing a tree or like columnar member comprising seat frame means for disposition about a tree for selective engagement therewith for supporting a user's main body and selective disengagement therefrom for sliding vertically therealong and foot frame means for disposition about a tree below said seat frame means for selective engagement therewith for supporting the user's feet and selective disengagement therefrom for sliding vertically therealong, said seat frame means and said foot frame means being operable by alternate engagement and disengagement, respectively, with the tree for alternating incremental movement thereof upwardly and downwardly along the tree, said seat frame means including a main seat frame member for engaging the tree at one side thereof and a seat bracing frame member for engaging the tree at the opposite side thereof, said main seat frame member including a unitary length of tubing formed into a generally U-shaped providing spaced seat frame arms and tree-engaging brace means rigidly welded to each said seat frame arm and extending therefrom in generally the same direction thereas for bracing engagement with said one side of the tree and said seat bracing frame member including a unitary length of tubing formed into a generally U-shape providing spaced seat bracing frame arms, said spaced seat frame arms and said spaced seat bracing frame arms being telescopically engagable for encircling disposition about the tree, and means selectively engagable with said seat frame arms and said seat bracing frame arms for rigidly affixing them in telescoping relation, whereby said main seat frame member and said seat bracing frame member respectively have substantially no points of increased susceptibility to stress and whereby in disposition about the tree increased stress is created in said seat frame means substantially only at said affixing means at said telescoping seat frame arms and seat bracing frame arms for maximized strength of said seat frame means and only compressive stress is exerted on the weld locations between said tree-engaging brace means and said main seat frame member, and said foot frame means including a main foot frame member for engaging the tree at said one side thereof and a foot bracing frame member for engaging the tree at the opposite side thereof, said foot frame member including a unitary length of tubing formed into a generally U-shaped providing spaced foot frame arms, tree-engaging platform brace means rigidly welded to said main foot frame member and extending therefrom in generally the same direction as said foot frame arms for bracing engagement with said one side of the tree, and bracing struts extending convergingly from said foot frame arms to a central location on said platform brace means for engagement by the feet of the user for manipulating movement of said foot frame means upward and downward along the tree, and said foot bracing frame member including a unitary length of tubing formed into a generally U-shape providing spaced foot bracing frame arms, said spaced foot frame arms and said spaced foot bracing frame arms being telescopically engageable for encircling disposition about the tree, and means selectively engagable with said foot frame arms and said foot bracing frame arms for rigidly affixing them in telescoping relation, whereby said main foot frame member and said foot bracing frame member respectively have substantially no points of increased susceptibility to stress and whereby in disposition about the tree increased stress is created in said foot frame means substantially only at said affixing means at said telescoping foot frame arms and foot bracing frame arms for maximized strength of said foot frame means and only compressive stress is exerted on the weld location between said tree-engaging platform brace means and said main foot frame member.

2. An apparatus according to claim 1 and characterized further in that said seat frame arms and said tree-engaging brace means define a leg extension opening in said seat frame means adapted in tree-climbing use for extension downwardly therethrough of the user's legs and permitting the user a full 360° range of body movement within said leg extension opening.

3. An apparatus according to claim 1 and characterized further in that said seat frame means and said foot frame means are compatibly constructed for nested receipt of one thereof by the other thereof for compact storage and transport thereof when not in tree-climbing use.

4. An apparatus according to claim 1 and characterized further in that said tree engaging brace means of said seat frame member includes a tree engaging element extending transversely of said seat frame arms therebelow, in that said platform brace means includes a tree engaging element at the free end thereof, and characterized further by blade means on each of said tree engaging elements of said brace means and said platform brace means and on each of said bracing frame members of said seat and foot frame means for frictional non-cutting engagement of the tree.

5. An apparatus according to claim 4 and characterized further in that said blade means includes teeth adapted for penetration of substantially only the bark of the tree.

6. An apparatus for climbing a tree or like columnar member of the type comprising seat frame means for disposition about a tree for selective engagement therewith for supporting a user's main body and selective disengagement from the tree for sliding vertically therealong and foot frame means for disposition about the tree at a spacing below said seat frame means for selective engagement with the tree for supporting the user's feet and selective disengagement from the tree for sliding vertically therealong, said seat frame means and said foot frame means being operable by alternate engagement and disengagement, respectively, with the tree for alternating incremental movement thereof upwardly and downwardly along the tree, said seat frame means said foot frame means being compatibly constructed for nested receipt of one thereof by the other thereof for compact storage and transport thereof when not in tree-climbing use, said seat frame means including a main seat frame member for engaging the tree at one side thereof and a seat bracing frame member for engaging the tree at the opposite side thereof, said main seat frame member having spaced seat frame arms, a seat element extending between said seat frame arms and tree-engaging brace means rigidly affixed to each said seat frame arms and extending therefrom in generally the same direction thereas, said brace means including a tree engaging element extending transversely of said seat frame arms therebelow and said seat frame arms being upwardly inclined toward their free ends from a location intermediate said seat element and said free ends, and said seat bracing frame member having spaced arms telescopically engagable in said seat frame arms to be separably affixed thereto and disposed in the same upward incline thereas, and said foot frame means including a main foot frame member for engaging the tree at said one side thereof and a foot bracing frame member for engaging the tree at said opposite side thereof, said main foot frame member having a foot platform element dimensioned smaller than the spacing between said seat frame arms, a tree engaging element at one end of said foot platform element, spaced foot frame arms extending from the opposite end of said foot platform element toward said one end thereof at substantially the same spacing as said seat frame arms and at the same upward incline as said seat frame arms, and bracing struts extending convergingly from said foot frame arms to a central location on said foot platform element for engagement by the feet of the user for manipulating movement of said foot frame means upward and downward along the tree, and said foot bracing frame member having spaced arms telescopically engagable in said foot frame arms to be separably affixed thereto and disposed in the same upward incline thereas, said foot frame means being nestably received by said seat frame means with said foot platform element received in the spacing between said seat frame arms and disposed fowardly of said seat element and overlying said tree-engaging element of said brace means and with said foot frame arms and said foot bracing frame member resting on said seat frame arms and said seat bracing frame member, respectively.

7. An apparatus according to claim 6 and characterized further in that said seat element, said seat frame arms and said tree-engaging bracing means of said seat frame means define a leg extension opening adapted in tree-climbing use for extension downwardly therethrough of the user's legs toward said foot frame means and permitting the user a full 360° range of body movement within said leg extension opening.

8. An apparatus according to claim 6 and characterized further by blade means on each of said tree-engaging elements of said brace means and said foot platform element and on each of said bracing frame members of said seat and foot frame means for frictional non-cutting engagement of the tree, each said blade means including teeth adapted for penetration of substantially only the bark of the tree.

9. An apparatus according to claim 6 and characterized further in that each of said seat frame member and said foot frame member and said seat bracing frame member and said foot bracing frame member are respectively fabricated unitarily with their said telescoping arms being the only non-rigidly affixed members whereby the strength of said apparatus is maximized and said apparatus creates relatively little noise in use.

* * * * *

UNITED STATES PATENT OFFICE
CERTIFICATE OF CORRECTION

Patent No. 4,417,645      Dated November 29, 1983

Inventor(s)   Reese E. Untz

It is certified that error appears in the above-identified patent and that said Letters Patent are hereby corrected as shown below:

Column 1, line 2, delete "Porta Climb Climbing Tree Stand" and insert therefor --Tree Climbing Apparatus-- .

Column 3, line 22, delete "To" and insert therefor --The-- .

Column 4, line 65, delete "U-shaped" and insert therefor --U-shape-- .

Column 5, line 24, delete "U-shaped" and insert therefor --U-shape-- .

Column 6, line 26, after "means" insert --and-- .

Signed and Sealed this

Twenty-fourth Day of December 1985

[SEAL]

Attest:

DONALD J. QUIGG

Attesting Officer    Commissioner of Patents and Trademarks